United States Patent
Rizzi et al.

(10) Patent No.: US 12,012,691 B2
(45) Date of Patent: Jun. 18, 2024

(54) METHOD AND COMPOSITION FOR INCREASING THE ELECTRICAL AND THERMAL CONDUCTIVITY OF A TEXTILE ARTICLE AND TEXTILE ARTICLE THUS OBTAINED

(71) Applicant: Directa Plus S.p.A., Lomazzo (IT)

(72) Inventors: Laura Giorgio Rizzi, Como (IT); Giulio Giuseppe Cesareo, Como (IT)

(73) Assignee: Directa Plus S.p.A., Lomazzo (IT)

(*) Notice: Subject to any disclaimer, the term of this patent is extended or adjusted under 35 U.S.C. 154(b) by 24 days.

(21) Appl. No.: 17/781,148

(22) PCT Filed: Dec. 2, 2020

(86) PCT No.: PCT/EP2020/084229
§ 371 (c)(1),
(2) Date: May 31, 2022

(87) PCT Pub. No.: WO2021/115868
PCT Pub. Date: Jun. 17, 2021

(65) Prior Publication Data
US 2022/0411993 A1  Dec. 29, 2022

(30) Foreign Application Priority Data
Dec. 11, 2019 (IT) .......... 102019000023607

(51) Int. Cl.
*D06M 11/74* (2006.01)
*C08K 3/04* (2006.01)
(Continued)

(52) U.S. Cl.
CPC ............. *D06M 11/74* (2013.01); *C09D 5/24* (2013.01); *C09D 7/20* (2018.01); *C09D 7/61* (2018.01);
(Continued)

(58) Field of Classification Search
CPC ...... D06M 11/74; D06M 11/45; D06M 11/46; D06M 11/76; D06M 15/263;
(Continued)

(56) References Cited

U.S. PATENT DOCUMENTS

2008/0083721 A1* 4/2008 Kaiserman ............ H05B 3/342
219/211
2010/0206863 A1 8/2010 Ritter
(Continued)

FOREIGN PATENT DOCUMENTS

| EP | 2570462 A1 | 3/2013 |
|---|---|---|
| WO | 2004024436 A1 | 3/2004 |
| WO | 2018202747 A1 | 11/2018 |

OTHER PUBLICATIONS

International Search Authority: European Patent Office International Search Report for corresponding International Patent Application No. PCT/EP2020/084229 dated Mar. 11, 2021, 4 pages.

*Primary Examiner* — Jennifer A Steele
(74) *Attorney, Agent, or Firm* — Patterson Intellectual Property Law, PC (57) ABSTRACT

Method and composition for increasing the electrical and thermal conductivity of a textile article comprising the application of a composition comprising graphene and an inorganic pigment, so as to form a layer that consists of a thermal circuit for optimal management of heat and an electrical circuit for dissipation of the static electricity accumulated on the textile article.

20 Claims, 1 Drawing Sheet

(51) Int. Cl.

| | |
|---|---|
| *C08K 3/08* | (2006.01) |
| *C08K 3/22* | (2006.01) |
| *C09D 5/24* | (2006.01) |
| *C09D 7/20* | (2018.01) |
| *C09D 7/40* | (2018.01) |
| *C09D 7/61* | (2018.01) |
| *C09D 175/04* | (2006.01) |
| *D06M 11/45* | (2006.01) |
| *D06M 11/46* | (2006.01) |
| *D06M 11/76* | (2006.01) |
| *D06M 15/263* | (2006.01) |
| *D06M 15/564* | (2006.01) |
| *D06M 15/693* | (2006.01) |
| *D06M 23/16* | (2006.01) |
| *D06M 101/32* | (2006.01) |

(52) U.S. Cl.
CPC ............. *C09D 7/70* (2018.01); *C09D 175/04* (2013.01); *D06M 11/45* (2013.01); *D06M 11/46* (2013.01); *D06M 11/76* (2013.01); *D06M 15/263* (2013.01); *D06M 15/564* (2013.01); *D06M 15/693* (2013.01); *D06M 23/16* (2013.01); *C08K 3/046* (2017.05); *C08K 3/08* (2013.01); *C08K 2003/2227* (2013.01); *C08K 2003/2241* (2013.01); *C08K 2003/2296* (2013.01); *D06M 2101/32* (2013.01)

(58) Field of Classification Search
CPC .. D06M 15/564; D06M 15/693; D06M 23/16; D06M 2101/32; D06M 11/73; D06M 11/79; D06M 23/08; D06P 1/673; Y10T 442/20; C09D 5/24; C09D 7/20; C09D 7/61; C09D 7/70; C09D 175/04; C08K 3/046; C08K 3/08; C08K 2003/2227; C08K 2003/2241; C08K 2003/2296
See application file for complete search history.

(56) References Cited

U.S. PATENT DOCUMENTS

| | | | |
|---|---|---|---|
| 2011/0268964 A1* | 11/2011 | Dornbusch | C08G 18/722 977/932 |
| 2013/0036802 A1 | 2/2013 | Johnson et al. | |
| 2015/0376014 A1* | 12/2015 | Cesareo | C09D 7/45 252/75 |
| 2016/0374411 A1* | 12/2016 | Brooks | A61F 7/007 165/104.21 |
| 2017/0190581 A1 | 7/2017 | Cesareo et al. | |
| 2017/0196513 A1 | 7/2017 | Longinotti-Buitoni et al. | |
| 2020/0087850 A1 | 3/2020 | Wu et al. | |

* cited by examiner

METHOD AND COMPOSITION FOR INCREASING THE ELECTRICAL AND THERMAL CONDUCTIVITY OF A TEXTILE ARTICLE AND TEXTILE ARTICLE THUS OBTAINED

The present invention relates to a method and to a composition for increasing the electrical and thermal conductivity of a textile article and to the textile article thus obtained.

BACKGROUND OF THE INVENTION

Making substrates that are not naturally conductive electrically and/or thermally conductive by producing conductive circuits on said substrates is known. In particular, producing conductive circuits by applying inks of conductive compositions to flexible substrates such as textile articles is known.

Films, polymer membranes and textile articles containing graphene, also coupled with other films or textile articles, for producing articles with some properties improved by the presence of a suitable amount of graphene, are known. In fact, graphene can increase the thermal and electrical conductivity of the textile article and thus make its use advantageous in the production of articles in various product sectors, for example in the sector of clothing and of electronics applied to fabrics.

The patent literature describes polymer compositions comprising graphene for producing films and articles comprising said film.

CN 105504773 (A) describes a conductive polyurethane film containing from 1 to 10 parts by weight of graphene, obtained with a process that involves premixing of the graphene with a part of the polyurethane and subsequent mixing with the rest of the polyurethane. The film obtained has an electrical conductivity of $10^3$-$10^5 \Omega$.

WO 2017/037642 A1 describes a production process of a multilayer membrane of polyurethane containing graphene. More in particular, the membrane is formed of a layer of polyurethane without graphene (called "neutral") and of a layer of polyurethane containing graphene, hence made conductive. In a preferred embodiment the conductive layer is provided with terminals for electrical connection to a battery adapted to apply a low voltage to the conductive layer and consequently heat the membrane Jie Xu et al. Polypyrrole/reduced graphene oxide coated fabric electrodes for supercapacitor application, *Organic Electronics*, September 2015, pp. 153-159, describe a cotton fabric onto which reduced graphene oxide and polypyrrol have been deposited, so as to cover the entire surface of the fabric.

US 2011/0143107 A1 describes a production process of metalized textile surfaces by depositing two metals according to a model with horizontal and vertical lines, with the application of one layer that comprises carbon in the form of carbon black, carbon nanotubes or graphenes. Articles having the textile surface metalized in this way can be used, for example, to produce heating mantles, textile articles that are luminous or suitable to monitor organs of the human body, or to protect from electromagnetic radiation.

WO 2018/055005 A1 describes flexible electronic components and methods for their production. The flexible electronic components comprise a textile substrate onto which a smoothing layer and a layer of nanoplatelets, for example graphene, are deposited; electrodes are subsequently applied to the latter. In this way, articles defined as "wearable electronics" are obtained.

WO2019/202028 A1 describes a textile article containing graphene in a composition that is deposited on the article so as to form a thermally conductive circuit, which also exhibits limited electrical conductivity.

EP 2300541 B1 describes mixtures of nanoplatelets of graphite and of pigments adapted to color various materials, for example to give the substrates on which they are applied a metallic-like coloration with the maximum opacity, i.e., capable of completely covering the substrate below. The pigments described are both of organic and inorganic type. These mixtures are particularly suitable for cosmetic use, for example for coloring shampoos, lipsticks, compositions for make-up and the like. No mention is made of electrical or thermal conductivity.

TW 1671453 B discloses a method of manufacturing a graphene conductive fabric which comprises laminating the fabric with a multilayer structure comprising different layers of materials produced separately then applied onto the fabric. The multilayer structure includes a hot glue layer deposited on the fabric to fill the interstices of the fabric, a graphene conductive layer on the hot glue layer so that the hot glue layer prevents the graphene from filling the interstices of the fabric, and an external hydrophobic protective layer. The manufacturing method comprises first preparing a graphene resin suspension on an organic solvent and adding a curable resin, then pouring this suspension on a hydrophobic protective layer, e.g. a silicon layer, and heating it to remove the solvents and obtain a conductive layer on the hydrophobic layer, then coating the graphene layer with a hot glue layer, and finally laminating the obtained multilayer structure on the fabric from the side of the hot glue layer, so that the hot glue layer can penetrate into the fabric but the graphene layer cannot. The graphene is in form of nano-graphene sheets of undisclosed size, purity and oxygen content. Carbon black is added to graphene layer in examples 4, 5 and 6. Separate fabrication of a multi-layered structure makes the method complex.

The prior art embodiments do not provide an optimal solution to the problem of dissipation both of heat and of electrical charges. The latter, in particular, which are mainly formed by rubbing, due to the non-conductive nature of the substrate tend to accumulate on the surface of the article to give rise—in specific conditions—to electrostatic discharges that are the cause of known problems, both with regard to people's comfort and due to the danger of damage to devices, and even fire.

SUMMARY OF THE INVENTION

Therefore, an object of the present invention is to provide a method for increasing the electrical and thermal conductivity of a textile article that is effective, simple and economically advantageous.

Another object of the present invention is to provide a composition for increasing the electrical and thermal conductivity suitable for use in the aforesaid method.

A further object of the invention is to provide a method for increasing the electrical and thermal conductivity of a textile article that comprises application of a said composition as a single layer directly onto the textile.

A still further object of the invention is to provide a textile article that can be used advantageously in the production of garments both for uniform heat distribution on the user's body and to dissipate the static electricity accumulated on this textile article.

Therefore, an aspect of the present invention concerns a method for increasing the electrical and thermal conductivity of a textile article, comprising the application on said textile article of a composition comprising:

a) from 10 to 40% by weight of a polymeric binder,
b) from 1 to 10% by weight of a compatibilizing solvent for said polymeric binder,
c) from 0.1 to 2% by weight of a thickener,
d) from 1 to 20% by weight of graphene consisting of graphene nanoplatelets, in which at least 90% have a lateral dimension (x, y) from 50 to 50000 nm and a thickness (z) from 0.34 to 50 nm, and in which the C/O ratio is ≥100:1;
e) from 40 to 80% by weight of water;
f) from 1 to 40% by weight of an inorganic pigment.

In the method according to the invention, the composition defined above is applied on the textile article by means of deposition of a layer by spreading, printing or spraying, or by immersing the article in the composition, followed by a step of heating the article to an increasing temperature comprised between 100 and 200° C., preferably between 120 and 180° C., for a period greater than 30 seconds, preferably between 1 and 10 minutes.

In the method according to the invention, the composition defined above is applied in a single layer directly onto the textile.

Another aspect of the present invention concerns the composition defined above adapted to increase the electrical and thermal conductivity of a textile article.

Therefore, a further aspect of the present invention concerns a textile article having an improved electrical and thermal conductivity, comprising the composition defined above.

Yet another aspect of the invention concerns a garment comprising the textile article having an increased electrical and thermal conductivity.

BRIEF DESCRIPTION OF THE DRAWINGS

The invention will now be described also with reference to FIG. 1, which is a schematic view of a textile article on which a composition for increasing the electrical and thermal conductivity, according to the method of the invention, has been applied.

DESCRIPTION OF THE INVENTION

In the present description the term "textile article" means a substantially flat article, such as a fabric, a nonwoven, a film or a polymer membrane, or a thread or yarn, as each of these articles can be used to produce of garments. With regard to the fabric, it can be made of natural, artificial or synthetic fiber. With regard to the nonwoven and the film or polymer membrane, these are typically produced with artificial fibers or synthetic resins. With regard to the thread or yarn, it can be natural, artificial or synthetic.

As stated above, the textile article according to the present invention can be used to produce garments or other articles, for example in the furnishing sector, such as seats, sofas and the like.

In order to increase the electrical and thermal conductivity of the textile article, and of the object like a garment consisting completely or partly of the textile article of the invention, a composition as defined above is applied on this textile article.

The method for increasing the electrical and thermal conductivity according to the invention is based on the discovery of an unexpected synergic effect between the component d) and the component f) of the composition defined above, i.e., between the graphene nanoplatelets having particular chemical-physical and dimensional properties, and an inorganic pigment. The components d) and f) are therefore the active components for the purpose of increasing electrical and thermal conductivity, or the balance between the two, while the other components have the function of allowing the production of the composition in a form applicable on a textile backing with the normal techniques and equipment used in the textile industry.

The composition adapted to increase the electrical and thermal conductivity according to the invention can be applied on the whole of the surface of the textile article or on a part thereof, depending on the specific application and of the final result required.

When the textile article, or the garment or the product comprising it, is in contact with or close to the human body, the composition of the invention forms a thermal circuit capable of optimally managing the heat absorbed, and simultaneously forms an electrical circuit capable of effectively dissipating the electrostatic charges accumulated on said article.

With regard to the thermal circuit, when the textile article forms a garment, or a part thereof, it is capable of uniformly distributing the heat absorbed but also of guaranteeing the breathability of the garment, so as to maximize the user's comfort.

With regard to the electrical circuit, it allows the effective dissipation of electrical charges which, as stated above, are formed mainly through rubbing and, due to the non-conductive nature of the substrate, tend to accumulate on the surface of the article, reducing the user's comfort or even giving rise to greater problems.

With regard to the material with which the textile article is made, it has been stated that this can be a natural, artificial or synthetic material. When the textile article is a nonwoven or a film or a polymer membrane, the material with which it is made is as a rule artificial or synthetic.

Natural fibers used include, for example, wool, silk and cotton. Useful artificial fibers include modified or regenerated cellulose fibers, such as viscose and cellulose acetate. Useful synthetic fibers comprise polyamide, including aromatic polyamides (aramids), polyester, polyurethane, polyacrylonitrile, polycarbonate, polypropylene, polyvinyl chloride and mixtures thereof. Moreover, fabrics obtained from mixtures of natural, artificial and synthetic fibers can advantageously be used.

The composition comprising graphene (component d) and inorganic pigment (component f) as active ingredients is applied on the textile article in liquid or paste form in a single layer.

Preferably, the graphene is present in an amount from 1.5 to 15% by weight on the total weight of the composition, more preferably between 2 and 10% by weight.

The graphene consists of graphene nanoplatelets, in which at least 90% have a lateral dimension (x, y) from 50 to 50000 nm and a thickness (z) from 0.34 to 50 nm, and in which the C/O ratio is ≥100:1. Preferably, at least 90% of the graphene nanoplatelets have a lateral dimensions (x, y) from 100 to 10000 nm and a thickness (z) from 0.34 to 10 nm.

Graphene is a material consisting of a monoatomic layer of $sp^2$ hybridized carbon atoms. Therefore, they are arranged in close-packed compact hexagonal, highly crystalline and regular honeycomb structures.

The scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of patents and patent applications relating to production methods of structures comprising layers of graphene, such as EP 2 038 209 B1, WO 2014/135455 A1 and WO 2015/193267 A1. These last two patent applications describe methods of producing highly pure graphene dispersions, from which it is possible to obtain graphene nanoplatelets with the dimension required for implementation of the present invention, and with a C/O ratio≥100:1. This ratio is important as it defines the maximum amount of oxygen bonded to the carbon forming the graphene. In fact, the best properties of graphene, which derive from its high crystallographic quality, are obtained when the amount of oxygen is minimum.

A highly pure graphene, i.e., with a C/O ratio≥100, and having the dimensional properties defined above is manufactured and marketed by Directa Plus S.p.A. with the tradename G+®. The C/O ratio in the graphene utilized in the textile article according to the invention is determined by means of elementary analysis performed by means of elementary analyzer (CHNS O), which provides the percentage by weight of the various elements. By normalizing the values obtained with respect to the atomic weight of the C and O species and finding their ratio, the C/O ratio is obtained.

It was found that the graphene in oxidized form, just as the graphene in the form obtained by reduction of the graphene oxide ("GO"), has different characteristics and properties to pristine graphene. For example, the characteristics of electrical and thermal conductivity and those of mechanical strength of the pristine graphene are greater than those of the GO and of the reduction product obtained therefrom, also due to the presence of numerous reticular defects and imperfections of the crystalline structure caused by the reduction reaction.

The reticular defects of the nanoplatelets can be evaluated by Raman spectrometry by analyzing the intensity and shape of the Peak D positioned at 1350 cm$^{-1}$.

According to embodiments described in the aforesaid patent documents by the Applicant Directa Plus S.p.A., the process for producing pristine graphene is carried out in a continuous way by continuously feeding the graphite flakes to the high temperature expansion step, continuously discharging the so-obtained expanded graphite in an aqueous medium and continuously subjecting the expanded graphite dispersed in the aqueous medium to the exfoliation and size reduction treatment carried out with the methods of ultrasonication and/or homogenization at high pressure.

As described in these patent documents, the final dispersion of the graphene nanoplatelets obtained can be concentrated or dried, depending on the final form desired for the graphene. The object of drying the dispersion is to obtain a dry powder that is easily redispersible in various matrices, both solvents and polymers, where liquid is not desirable or manageable at process level, or where water cannot be used due to chemical incompatibility.

A significant advantage of the production processes described in the patent documents WO 2014/135455 A1 and WO 2015/193267 A1 consists in the possibility of operating without using surfactants. In fact, the graphene nanoplatelets thus obtained are highly pure, both due to the high C/O ratio and to the absence of extraneous substances that might contaminate them, such as surfactants. In fact, it has been found that in the absence of surfactants it is possible to obtain graphene having substantially higher electrical conductivity than that of graphene obtained with processes using surfactants. This improves the performance of the graphene in a plurality of applications.

The highly pure graphene nanoplatelets, at least 90% of which have a lateral dimension (x, y) from 50 to 50,000 nm and a thickness (z) from 0.34 to 50 nm, having a C/O ratio≥100:1, have a high electrical conductivity. It was also seen that when a dispersion of graphene nanoplatelets is formed in the presence of a surfactant, this deposits on the surface thereof and tends to promote its agglomeration.

In the present description the dimension of the graphene nanoplatelets is defined with reference to a system of Cartesian axes x, y, z, it being understood that the particles are substantially flat platelets but may also have an irregular shape. In any case, the lateral dimension and the thickness provided with reference to the directions x, y and z must be intended as the maximum dimensions in each of the aforesaid directions.

The lateral dimensions (x, y) of the graphene nanoplatelets are determined—within the scope of the production process described above—using the scanning electron microscope (SEM), after diluting the final dispersion in deionized water in a ratio of 1:100 and depositing it dropwise on a silicon oxide substrate, placed on a heated plate at 100° C.

Alternatively, having nanoplatelets in dry state, SEM analysis is carried out directly on the powder deposited on a disc of double sided adhesive carbon tape. In both cases, the measurement is carried out on at least 100 nanoplatelets.

The thickness (z) of the graphene nanoplatelets is determined with the atomic force microscope (AFM), which is essentially a profilometer with subnanometer resolution, widely used for characterization (mainly morphological) of the surfaces and of the nanomaterials. This type of analysis is commonly used to evaluate the thickness of the graphene flakes, produced with any method, and thus detect the number of layers forming the flake (single layer=0.34 nm).

The thickness (z) can be determined using a dispersion of nanoplatelets diluted in a ratio of 1:1000 in isopropanol, from which 20 ml is then collected and subjected to sonication in an ultrasonic bath (Elmasonic S40) for 5 minutes. The nanoplatelets are then deposited as described for SEM analysis and are scanned directly with an AFM tip, where the measurement provides a topographical image of the graphene flakes and their profile with respect to the substrate, enabling precise measurement of the thickness. The measurement is performed on at least 50 nanoplatelets.

Alternatively, having nanoplatelets in dry state, the powder is dispersed in isopropanol at a concentration of 2 mg/L. 20 ml is then collected and subjected to sonication in an ultrasonic bath (Elmasonic S40) for 30 minutes. The nanoplatelets are then deposited as described for SEM analysis and are scanned directly by means of AFM.

In the concentrated final dispersion or in the dry form obtained after drying, at least 90% of the graphene nanoplatelets preferably have a lateral dimension (x, y) from 50 to 5000 nm and a thickness (z) from 0.34 to 50 nm, and a C/O ratio≥100:1. Preferably at least 90% of the graphene nanoplatelets have a lateral dimension (x, y) from 100 to 10000 nm and a thickness (z) from 0.34 to 10 nm, more preferably a lateral dimension (x, y) from 200 to 8000 nm, and even more preferably between 500 and 5000 nm, and preferably a thickness (z) from 0.34 to 8 nm, more preferably from 0.34 to 5 nm.

The graphene nanoplatelets having the aforesaid characteristics of dimension and purity, hence having a very low oxygen content, as defined by the aforesaid C/O ratio, and not functionalized with other molecules, have proved particularly suitable to be applied on a textile article in synergic combination with an inorganic pigment, in order to form a thermal and electrical circuit capable of evenly distributing the heat along the circuit and of dissipating the electrostatic charges.

The inorganic pigment (component f) is preferably selected from the group consisting of alkaline earth metal oxides and carbonates (Group 2 of the Periodic Table, new notation), transition metal oxides and carbonates (Groups 3-12 of the Periodic Table, new notation), of oxides of the elements of Groups 13 and 14 of the Periodic Table (new notation), carbon and of allotropes of carbon.

According to an aspect of the invention, the inorganic pigment (component f) is selected from the group consisting of alkaline earth metal oxides and carbonates (Group 2 of the Periodic Table, new notation), transition metal oxides and carbonates (Groups 3-12 of the Periodic Table, new notation), of oxides of the elements of Groups 13 and 14 of the Periodic Table (new notation).

More preferably, the inorganic pigment is selected from calcium carbonate, titanium dioxide, zirconium dioxide, zinc oxide, aluminum oxide, silicon dioxide, carbon black and graphite. According to an aspect of the invention, the inorganic pigment (component f) is selected from the group consisting of calcium carbonate, titanium dioxide, zirconium dioxide, zinc oxide, aluminum oxide, silicon dioxide.

The inorganic pigment is preferably present in a weighted ratio from 1:1 to 2:1 with respect to the graphene, and in an amount from 2 to 30% by weight on the total weight of the composition, more preferably between 3 and 20% by weight.

The composition for application on the textile article of the invention is preferably in liquid or paste form, where the liquid is preferably water or a mixture of water with other solvents and/or dispersants.

Besides the components d) (graphene) and f) (inorganic pigment) the composition comprises:
- a) from 10 to 40% by weight, preferably from 10 to 30% by weight, of a polymeric binder;
- b) from 1 to 10% by weight, preferably from 3 to 8% by weight, of a compatibilizing solvent for said polymeric binder,
- c) from 0.1 to 2% by weight, preferably from 0.15 to 1.5% by weight, of a thickener,
- e) preferably from 50 to 70% by weight of water.

Preferably the polymeric binder a) is selected from the group consisting of polyurethanes, polyacrylates, polybutadiene, copolymers of acrylic acid. The preferred polyurethanes are anionic polyurethanes, for example obtainable by reaction of one or more diisocyanates, preferably aliphatic or cycloaliphatic diisocyanates, with one or more polyester diols, and preferably one or more hydroxy carboxylic acids, for example hydroxy acetic acid, or preferably dihydroxy carboxylic acids. A preferred binder is a polyester based aliphatic polyurethane formulated with isocyanate cross-linker.

Preferably the compatibilizing solvent b) for the polymeric binder is ethylene or propylene glycol.

The thickener c) can be a natural or synthetic thickener.

Examples of inorganic natural thickeners are laminar silicates such as bentonite. Examples of organic natural thickeners are proteins, such as caseins or polysaccharides. Natural thickeners selected from agar agar, gum arabic and alginates are particularly preferred.

Examples of synthetic thickeners are generally liquid solutions of synthetic polymers, in particular polyacrylates.

Preferably, the graphene d) consists of graphene nanoplatelets at least 90% of which have a lateral dimension (x, y) from 50 to 50000 nm and a thickness (z) from 0.34 to 50 nm, and a C/O ratio≥100:1. Preferably, at least 90% of the graphene nanoplatelets have a lateral dimension (x, y) from 100 to 10000 nm and a thickness (z) from 0.34 to 10 nm, more preferably a lateral dimension (x, y) from 200 to 8000 nm, even more preferably between 500 and 5000 nm, and even more preferably a thickness (z) from 0.34 to 8 nm, more preferably from 0.34 to 5 nm.

Preferably, the composition also comprises a dispersant g) selected from naphthalensulfonate, polyethylene glycol (PEG), polyvinylpyrrolidone (PVP).

Preferably, the composition also comprises an anti-foaming agent h) selected from silicone antifoams, alkoxylated fatty alcohols, $C_8$-$C_{20}$ fatty acid alkyl esters.

The sum of the dispersant g) and of the antifoam agent h) in the composition varies from 0.1 to 2% by weight.

Preparation of the composition comprising the components a)-f) as defined above is carried out preferably introducing the polymeric binder a) pre-dispersed in water e) in a receptacle stirred with a rotary blade, into which the graphene d), the compatibilizing agent b), the thickener c), the inorganic pigment f) and preferably the dispersant g) are then introduced. The composition is stirred until obtaining a uniform dispersion. Typically, stirring is carried out at a rotation speed of the stirrer between 1000 and 2500 rpm for a time from 1 to 2 hours. According to an aspect of the invention, the composition is in paste or liquid form. When in paste form, it has a viscosity from 4000 to 30000 cPs.

The viscosity of the composition is preferably in the range from 10000 to 20000 cPs.

The viscosity is also regulated by means of the amount of thickener in the range 0.1-2% by weight.

The viscosity is measured with a Fungilab series Viscolead PRO rotational viscometer, spindle R6 speed rpm 10, measurement at T=20° C.

Application of the composition on the textile article is carried out in various known ways, as stated above, including the screen printing method.

Regardless of the way, application of the composition on the textile article is carried out as a single layer, namely all the components of the composition are mixed together as described above, then the composition is directly applied on the textile article as a single layer.

The application of the composition containing graphene as a single layer on the textile article allows a direct contact of the graphene nanoplatelets and the inorganic pigment with the textile article. Differently from certain methods of the prior art, it has been found that a direct contact of graphene with the textile article does not have any undesired effect. On the contrary, it allows simplifying the method by applying in one single layer the composition containing graphene directly on the textile article, without the need of a glue layer on the textile article and a protective layer on the graphene layer.

Application of the composition on the textile article is preferably followed by a step of heating the article to an increasing temperature comprised between 100 and 200° C., preferably between 120 and 180° C. for a time greater than 30 seconds, preferably between 1 and 10 minutes.

According to an operating mode, the textile article is placed in an oven and heated to a temperature comprised between 120 and 180° C. for a time between 1 and 10 minutes. The heat treatment causes evaporation of the liquid, completion of polymerization of the polymeric binder and/or crosslinking of its components, and hardening of the composition. The thickness of the layer is comprised between 2 and 300 μm, preferably between 5 and 200 μm, more preferably between 10 and 100 μm.

Application of the composition on the textile article gives rise to the formation of a thermal and electrical circuit characterized by the following parameters:
  i. Thermal conductivity in the order of several W/mK. It must be considered that the thermal conductivity of a metal is generally >20 W/mK, and that of insulating polymers is generally <0.1 W/mK.
  ii. Electrical conductivity: surface resistivity in the order of $10^3$-$10^4 \Omega/\square$, i.e., the circuit is a good conductor.

The result obtained with the method of the invention is surprising and unexpected as it is known that inorganic pigments are electrical insulators and therefore it was not expected that their addition to a composition containing graphene would increase its electrical conductivity. With regard to carbon black and graphite, their addition to a composition containing graphene in any case produces an increase of electrical conductivity of at least one order of magnitude, which in any case represents an unexpected result and is indicative of a synergic effect. Application of the composition on the textile article is carried out by coating the surface of the article with a single layer adapted to obtain a thermal and electrical circuit that combines the performance of the graphene and of the inorganic pigment with the technically relevant properties of the textile article, such as airflow, breathability and weight.

Figure 1:
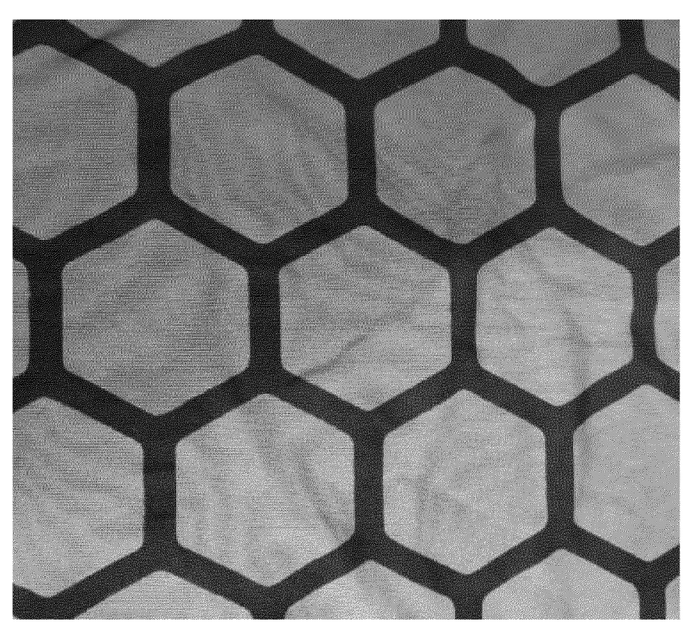

According to an embodiment, the composition is applied on a part of the surface of the textile article, leaving areas of article not covered by the composition. When the areas covered by the composition are connected to one another this forms a thermal and electrical circuit in the form of a mesh, as shown in FIG. 1.

Therefore, the textile article thus obtained can be used advantageously to produce articles in the clothing sector, particularly clothing intended for sport and leisure. Other sectors of use of the textile article are furnishing and specific technical articles.

The examples below illustrate some embodiments of the invention and are provided purely by way of non-limiting example.

Example 1 (Comparison)

Preparation of the Composition 1 Containing Graphene

In a receptacle equipped with a mechanical stirrer (Dissolver DISPERMAT® CN100, Heavy Duty disc diameter 350 mm) the rotation speed is adjusted to 200 rpm and the following are introduced:
  100 kg of polymeric binder consisting of pre-catalyzed water-based polyurethane resin containing 30% by weight of dry polymer (Resin E9010 marketed by CPL Chimica, Italy) and 70% by weight of water
  3.9 kg of graphene powder G+ manufactured by Directa Plus SpA, consisting of nanoplatelets having a lateral dimension comprised between 500 and 10000 nm, a thickness comprised between 0.34 and 3 nm, and a C/O ratio=135
  6 kg of compatibilizing solvent consisting of ethylene glycol (Sigma Aldrich)
  0.4 kg of dispersant consisting of naphthalene sulfate (BASF)
  0.2 kg of thickener (SINTEX CA, CPL Chimica, Italy). A paste having a viscosity of 20000 cPs is obtained and stirring is taken to 1000 rpm and maintained for 5.5 hours.

The viscosity is measured with a Fungilab series Viscolead PRO rotational viscometer, spindle R6 speed rpm 10, measurement at T=20° C.

The concentration of graphene in the paste is 3.5% by weight.

Example 2 (Invention)

Preparation of the Composition 2 Containing Graphene and Titanium Dioxide

Starting from the composition 1, 6 kg of titanium dioxide in powder (Nanografi) and 1 kg of ethylene glycol are added and stirring is continued for a further 2 hours. A paste having a viscosity of 21300 cPs is obtained.

In the paste thus obtained the concentration of graphene is 3.3% by weight and the concentration of titanium dioxide is 5.1% by weight.

The composition 1 and the composition 2 are printed on a 100% polyester fabric (article "Detroit", 100 g/m², Manifattura Effepi) by means of screen printing in a square with regular hexagonal pattern, as shown in FIG. 1 (inner side of the hexagon 20 mm and line thickness 6 mm) and then dried in an oven at 150° C. for 3 minutes. The following are then measured: surface resistivity of the two fabrics using the 4 point method (LORESTA GX, standard JIS K 7194), planar thermal conductivity (HOT-DISK TPS 3500, ISO 22007-2) and print thickness by means of micrometer. The comparison results are set down in Table 1.

TABLE 1 results of the characterization of the compositions 1, 2 printed on fabric

| Composition (% by weight) | Graphene | Titanium dioxide | Thickness (micron) | Surface resistivity ($\Omega/\square$) | Thermal conductivity (W/mK) |
|---|---|---|---|---|---|
| 1 (comparison) | 3.5% | 0% | 30 | $2.67 \cdot 10^5$ | 2.4 |
| 2 (invention) | 3.3% | 5.1% | 40 | $1.16 \cdot 10^4$ | 2.7 |

As can be seen from Table 1, the combination of graphene and inorganic pigment consisting of titanium dioxide improved the thermal conductivity by around 12%, and allowed a reduction in surface resistivity, hence an increase in electrical conductivity, of over one order of magnitude.

Example 3 (Invention)

Preparation of the Composition 3 Containing Graphene and Carbon Black

Starting from the composition 1, 6 kg of carbon black in powder (Ensaco 250, Imerys) and 4 kg of ethylene glycol are added and stirring is continued for 4 hours (composition 3), obtaining a paste with a viscosity of 25000 cPs.

In the paste thus obtained the concentration of graphene is 3.2% by weight and the concentration of carbon black is 5% by weight.

Example 4 (Comparison)

Preparation of the Composition 4 Containing Carbon Black, without Graphene

A reference composition is also prepared with which to compare the composition 3, i.e., a composition containing the components a), b) c), e) and f), in which f) consists of carbon black, but without component d), i.e., without graphene (composition 4).

In a receptacle equipped with a mechanical stirrer (Dissolver DISPERMAT® CN100, Heavy Duty disc diameter 350 mm) the rotation speed is adjusted to 200 rpm and the following are introduced:
- 100 kg of polymeric binder consisting of pre-catalyzed water-based polyurethane resin containing around 30% of dry polymer (Resin E9010 marketed by CPL Chimica, Italy):
- 5.5 kg of carbon black in powder (Ensaco 250, Imerys)
- 3 kg of compatibilizing solvent consisting of ethylene glycol (Sigma Aldrich)
- 0.4 kg of dispersant consisting of naphthalene sulfate (BASF)
- 0.2 kg of thickener (SINTEX CA, CPL Chimica, Italy).

A paste having a viscosity of 22500 cPs is obtained and stirring is taken to 1000 rpm and maintained for 5.5 hours. The viscosity is measured with a Fungilab series Viscolead PRO rotational viscometer, spindle R6 speed rpm 10, measurement at T=20° C.

The concentration of carbon black in the paste is 5% by weight.

The composition 4 and the composition 5 are printed on a 100% polyester fabric (article "Detroit", 100 g/m², Manifattura Effepi) by means of screen printing in a square with regular hexagonal pattern, as shown in FIG. 1 (inner side of the hexagon 20 mm and line thickness 6 mm) and then dried in an oven at 150° C. for 3 minutes. The following are then measured: surface resistivity of the two fabrics using the 4 point method (LORESTA GX, standard JIS K 7194), planar thermal conductivity (HOT-DISK TPS 3500, ISO 22007-2) and print thickness by means of micrometer. The comparison results are set down in Table 2.

TABLE 2 results of the characterization of the
compositions 3, 4 printed on fabric

| Composition | Graphene | Carbon black | Thickness (micron) | Surface resistivity ($\Omega/\square$) | Thermal conductivity (W/mK) |
|---|---|---|---|---|---|
| 3 (invention) | 3.2% | 5% | 45 | $2.67 \cdot 10^3$ | 2.34 |
| 4 (comparison) | 0% | 5% | 45 | $1.35 \cdot 10^6$ | 1.95 |
| 1 (comparison) | 3.5% | 0% | 30 | $2.67 \cdot 10^5$ | 2.4 |

As can be seen from Table 2, the combination of graphene and inorganic pigment consisting of carbon black allowed:
- With respect to the composition 4 with only inorganic pigment, an increase in thermal conductivity of around 20%, and a reduction in surface resistivity, hence an increase in electrical conductivity, of over three orders of magnitude.
- With respect to the composition 1 with only graphene, thermal conductivity to be maintained more or less the same and a reduction in surface resistivity, hence an increase in electrical conductivity, of two orders of magnitude.

Example 5 (Invention)

Preparation of the Composition 5 Containing Graphene and Alumina

Starting from the composition 1, 12.5 kg of alumina in powder (dimension 5-25 μm, Nanografi) and 3 kg of solvent are added and stirring is continued for 2 hours (composition 5), obtaining a paste with a viscosity of 22000 cPs.

In the paste thus obtained the concentration of graphene is 3.1% by weight and the concentration of alumina is 10% by weight.

Example 6 (Comparison)

Preparation of the Composition 6 Containing Alumina, without Graphene

A reference composition is also prepared with which to compare the composition 5, i.e., a composition containing the components a), b) c), e) and f), in which f) consists of alumina, but without component d), i.e., without graphene (composition 6).

In a receptacle equipped with a mechanical stirrer (Dissolver DISPERMAT® CN100, Heavy Duty disc diameter 350 mm) the rotation speed is adjusted to 200 rpm and the following are introduced:
- 100 kg of polymeric binder consisting of pre-catalyzed water-based polyurethane resin containing 30% by weight of dry polymer (Resin E9010 marketed by CPL Chimica, Italy):
- 11.5 kg of alumina in powder (dimension 5-25 μm, Nanografi)
- 2 kg of compatibilizing solvent consisting of ethylene glycol (Sigma Aldrich)
- 0.2 kg of dispersant consisting of naphthalene sulfate (BASF)
- 0.2 kg of thickener (SINTEX CA, CPL Chimica, Italy).

A paste having a viscosity of 20300 cPs is obtained and stirring is taken to 1000 rpm and maintained for 3.5 hours. The viscosity is measured with a Fungilab series Viscolead PRO rotational viscometer, spindle R6 speed rpm 10, measurement at T=20° C.

In the paste thus obtained the concentration of alumina is 10.1% by weight.

The composition 5 and the composition 6 are printed on a 100% polyester fabric (article "Detroit", 100 g/m², Manifattura Effepi) by means of screen printing in a square with regular hexagonal pattern, as shown in FIG. 1 (inner side of the hexagon 20 mm and line thickness 6 mm) and then dried in an oven at 150° C. for 3 minutes. The following are then measured: surface resistivity of the two fabrics using the 4 point method (LORESTA GX, standard JIS K 7194), planar thermal conductivity (HOT-DISK TPS 3500, ISO 22007-2) and print thickness by means of micrometer. The comparison results are set down in Table 3.

TABLE 3 results of the characterization of the
compositions 5, 6 printed on fabric

| Composition | Graphene | Alumina | Thickness (micron) | Surface resistivity ($\Omega/\square$) | Thermal conductivity (W/mK) |
|---|---|---|---|---|---|
| 5 (invention) | 3.1% | 10% | 55 | $3.84 \cdot 10^4$ | 2.42 |
| 6 (comparison) | 0% | 10.1% | 30 | $2.24 \cdot 10^9$ | 1.96 |
| 1 (comparison) | 3.5% | 0% | 30 | $2.67 \cdot 10^5$ | 2.4 |

As can be seen from Table 3, the combination of graphene and inorganic pigment consisting of alumina allowed:
- With respect to the composition 6 with only inorganic pigment, an increase in thermal conductivity of around 22%, and a reduction in surface resistivity, hence an increase in electrical conductivity, of over five orders of magnitude.

With respect to the composition 1 with only graphene, thermal conductivity to be maintained more or less the same and a reduction in surface resistivity, hence an increase in electrical conductivity, of over one order of magnitude.

Example 7 (Invention)

Preparation of the Composition 7 Containing Graphene and Zirconium

Starting from the composition 1, 5.8 kg of zirconium in powder (dimension: 30 nm, Nanografi) and 1 kg of solvent are added and stirring is continued for 2 hours obtaining a paste with a viscosity of 22100 cPs.

In the paste thus obtained the concentration of graphene is 3.3% by weight and the concentration of zirconium is 4.9% by weight.

Example 8 (Comparison)

Preparation of the Composition 8 Containing Zirconium, without Graphene

A reference composition is also prepared with which to compare the composition 7, i.e., a composition containing the components a), b) c), e) and f), in which f) consists of zirconium, but without component d), i.e., without graphene (composition 8).

In a receptacle equipped with a mechanical stirrer (Dissolver DISPERMAT® CN100, Heavy Duty disc diameter 350 mm) the rotation speed is adjusted to 200 rpm and the following are introduced:

100 kg of polymeric binder consisting of pre-catalyzed water-based polyurethane resin containing 30% by weight of dry polymer (Resin E9010 marketed by CPL Chimica, Italy):

5.5 kg of zirconium in powder (dimension 30 nm, Nanografi)

2 kg of compatibilizing solvent consisting of ethylene glycol (Sigma Aldrich)

0.2 kg of dispersant consisting of naphthalene sulfate (BASF)

0.2 kg of thickener (SINTEX CA, CPL Chimica, Italy).

A paste having a viscosity of 25000 cPs is obtained and stirring is taken to 1000 rpm and maintained for 3.5 hours. The viscosity is measured with a Fungilab series Viscolead PRO rotational viscometer, spindle R6 speed rpm 10, measurement at T=20° C.

In the paste thus obtained the concentration of zirconium is 5.1% by weight.

The composition 7 and the composition 8 are printed on a 100% polyester fabric (article "Detroit", 100 g/m$^2$, Manifattura Effepi) by means of screen printing in a square with regular hexagonal pattern, as shown in FIG. 1 (inner side of the hexagon 20 mm and line thickness 6 mm) and then dried in an oven at 150° C. for 3 minutes. The following are then measured: surface resistivity of the two fabrics using the 4 point method (LORESTA GX, standard JIS K 7194), planar thermal conductivity (HOT-DISK TPS 3500, ISO 22007-2) and print thickness by means of micrometer. The comparison results are set down in Table 4.

TABLE 4 results of the characterization of the compositions 7, 8 printed on fabric

| Composition | Graphene | Zirconium | Thickness (micron) | Surface resistivity ($\Omega/\square$) | Thermal conductivity (W/mK) |
|---|---|---|---|---|---|
| 7 (invention) | 3.3% | 4.9% | 50 | $3.55 \cdot 10^4$ | 2.45 |
| 8 (comparison) | 0% | 5.1% | 66 | $4.62 \cdot 10^8$ | 1.97 |
| 1 (comparison) | 3.5% | 0% | 30 | $2.67 \cdot 10^5$ | 2.4 |

As can be seen from Table 4, the combination of graphene and inorganic pigment consisting of zirconium allowed:

With respect to the composition 8 with only inorganic pigment, an increase in thermal conductivity of around 24%, and a reduction in surface resistivity, hence an increase in electrical conductivity, of around four orders of magnitude.

With respect to the composition 1 with only graphene, thermal conductivity to be maintained more or less the same and a reduction in surface resistivity, hence an increase in electrical conductivity, of over one order of magnitude.

Example 9 (Invention)

Preparation of the Composition 9 Containing Graphene and Zinc Oxide

Starting from the composition 1, 6 kg of zinc oxide in powder (dimension: 30-50 nm, Nanografi) and 2 kg of solvent are added and stirring is continued for 2 hours (composition 9), obtaining a paste with a viscosity of 21100 cPs.

In the paste thus obtained the concentration of graphene is 3.3% by weight and the concentration of zinc oxide is 5.1% by weight.

Example 10 (Comparison)

Preparation of the Composition 10 Containing Zinc Oxide, without Graphene

A reference composition is also prepared with which to compare the composition 9, i.e., a composition containing the components a), b) c), e) and f), in which f) consists of zinc oxide, but without component d), i.e., without graphene (composition 10).

In a receptacle equipped with a mechanical stirrer (Dissolver DISPERMAT® CN100, Heavy Duty disc diameter 350 mm) the rotation speed is adjusted to 200 rpm and the following are introduced:

100 kg of polymeric binder consisting of pre-catalyzed water-based polyurethane resin containing 30% by weight of dry polymer (Resin E9010 marketed by CPL Chimica, Italy):

5.4 kg of zinc oxide in powder (dimension 30-50 nm, Nanografi)

2 kg of compatibilizing solvent consisting of ethylene glycol (Sigma Aldrich)

0.2 kg of dispersant consisting of naphthalene sulfate (BASF)

0.2 kg of thickener (SINTEX CA, CPL Chimica, Italy).

A paste having a viscosity of 24000 cPs is obtained and stirring is taken to 1000 rpm and maintained for 3.5 hours. The viscosity is measured with a Fungilab series Viscolead PRO rotational viscometer, spindle R6 speed rpm 10, measurement at T=20° C.

In the paste thus obtained the concentration of zinc oxide is 5% by weight.

The composition 9 and the composition 10 are printed on a 100% polyester fabric (article "Detroit", 100 g/m², Manifattura Effepi) by means of screen printing in a square with regular hexagonal pattern, as shown in FIG. 1 (inner side of the hexagon 20 mm and line thickness 6 mm) and then dried in an oven at 150° C. for 3 minutes. The following are then measured: surface resistivity of the two fabrics using the 4 point method (LORESTA GX, standard JIS K 7194), planar thermal conductivity (HOT-DISK TPS 3500, ISO 22007-2) and print thickness by means of micrometer. The comparison results are set down in Table 5.

TABLE 5 results of the characterization of the compositions 9, 10 printed on fabric

| Composition | Graphene | Zinc oxide | Thickness (micron) | Surface resistivity (Ω/□) | Thermal conductivity (W/mK) |
|---|---|---|---|---|---|
| 9 (invention) | 3.3% | 5.1% | 80 | $1.84 \cdot 10^4$ | 2.20 |
| 10 (comparison) | 0% | 5% | 60 | $8.86 \cdot 10^8$ | 1.98 |
| 1 (comparison) | 3.5% | 0% | 30 | $2.67 \cdot 10^5$ | 2.4 |

As can be seen from Table 5, the combination of graphene and inorganic pigment consisting of zinc oxide allowed:

With respect to the composition 10 with only inorganic pigment, an increase in thermal conductivity of around 11%, and a reduction in surface resistivity, hence an increase in electrical conductivity, of around four orders of magnitude.

With respect to the composition 1 with only graphene, thermal conductivity to be maintained more or less the same and a reduction in surface resistivity, hence an increase in electrical conductivity, of over one order of magnitude.

The invention claimed is:

1. A method for increasing the electrical and thermal conductivity of a textile article, the method comprising:
    applying on said textile article a composition comprising:
    a. from 10 to 40% by weight of a polymeric binder;
    b. from 1 to 10% by weight of a compatibilizing solvent for said polymeric binder;
    c. from 0.1 to 2% by weight of a thickener;
    d. from 2 to 10% by weight of graphene consisting of graphene nanoplatelets, in which at least 90% have a lateral dimension (x, y) from 50 to 50000 nm and a thickness (z) from 0.34 to 50 nm, and in which a C/O ratio is ≥100:1;
    e. from 40 to 80% by weight of water; and
    f. from 1 to 40% by weight of an inorganic pigment;
    wherein said inorganic pigment is chosen from the group consisting of: oxides or carbonates of alkaline-earth metals, oxides or carbonates of transition metals, oxides of elements of Groups 13 or 14 of the Periodic Table, carbon, allotropes of carbon, and combinations thereof; and
    heating the textile article to an increasing temperature comprised between 100 and 200° C., for a period greater than 30 seconds.

2. The method of claim 1, wherein said inorganic pigment is chosen from the group consisting of: calcium carbonate, titanium dioxide, zirconium dioxide, zinc oxide, aluminum oxide, silicon dioxide, carbon black, graphite, and combinations thereof.

3. The method of claim 1, wherein said inorganic pigment is chosen from the group consisting of: calcium carbonate, titanium dioxide, zirconium dioxide, zinc oxide, aluminum oxide, silicon dioxide, and combinations thereof.

4. The method of claim 1, wherein at least 90% of said graphene nanoplatelets have a lateral dimension (x, y) from 100 to 10000 nm and a thickness (z) from 0.34 to 10 nm.

5. The method of claim 1, wherein said graphene is present in an amount of from 1.5 to 15% by weight on the total weight of the composition.

6. The method of claim 1, wherein the application of said composition on said textile article forms a layer having a thickness from 2 to 300 µm.

7. The method of claim 6, wherein the application of said composition on said textile article forms a layer having a thickness from 5 to 200 µm.

8. The method of claim 7, wherein the application of said composition on said textile article forms a layer having a thickness from 10 to 100 µm.

9. The method of claim 1, wherein said inorganic pigment is present in a weight ratio of 1:1 to 2:1 with respect to the graphene, and in an amount of from 2 to 30% by weight on a total weight of said composition.

10. The method of claim 9, wherein said inorganic pigment is present in an amount of from 3 to 20% by weight on the total weight of said composition.

11. The method of claim 1, wherein said composition is in paste or liquid form.

12. The method of claim 1, wherein said composition is in paste form and has a viscosity of from 4000 to 30000 cps.

13. The method of claim 12, wherein said composition is in paste form and has a viscosity in the range from 10000 to 20000 cps.

14. The method of claim 1, wherein the composition includes a dispersant and an antifoam agent present in an amount of from 0.1 to 2% by weight on the total weight of said composition.

15. A composition comprising:
    a. from 10 to 40% by weight of a polymeric binder;
    b. from 1 to 10% by weight of a compatibilizing solvent for said polymeric binder;
    c. from 0.1 to 2% by weight of a thickener;
    d. from 2 to 10% by weight of graphene consisting of graphene nanoplatelets, in which at least 90% have a lateral dimension (x, y) from 50 to 50000 nm and a thickness (z) from 0.34 to 50 nm, and in which a C/O ratio is ≥100:1;
    e. from 40 to 80% by weight of water; and
    f. from 1 to 40% by weight of an inorganic pigment;
    wherein said polymeric binder is chosen from a group consisting of polyurethanes, polyacrylates, polybutadiene, copolymers of acrylic acid, and combinations thereof, and wherein said inorganic pigment is chosen from the group consisting of: oxides or carbonates of alkaline-earth metals, oxides or carbonates of transition metals, oxides of elements of Group 13 or 14 of the Periodic Table, carbon, allotropes of carbon, and combinations thereof.

16. The composition of claim 15, wherein said compatibilizing solvent for the polymeric binder comprises ethylene glycol or propylene glycol.

17. The composition of claim 15, having a viscosity of from 4000 to 30000 cps.

18. The composition of claim 15, wherein the composition includes a dispersant and an antifoam agent, wherein said dispersant and antifoam agent are present in an amount of from 0.1 to 2% by weight on the total weight of said composition.

19. A textile article comprising the composition according to claim 15.

20. The textile article of claim 19, wherein upon application of the composition to the textile article, the textile article is heated to an increasing temperature comprised between 100 and 200° C., for a period greater than 30 seconds.

* * * * *